United States Patent
Hall

(10) Patent No.: US 11,417,230 B1
(45) Date of Patent: Aug. 16, 2022

(54) SYSTEM, METHOD, AND TEACHING AID FOR ENABLING ALL STUDENTS WHO ARE WILLING TO BE ABLE TO ACHIEVE MASTERY OF LEARNING CONTENT AND A SYSTEM FOR EFFICIENTLY SYSTEMATICALLY INCREASING THE LEVEL THAT DEFINES MASTERY

(71) Applicant: Douglas B. Hall, Newtown, OH (US)

(72) Inventor: Douglas B. Hall, Newtown, OH (US)

(73) Assignee: EUREKA! INSTITUTE, INC., Newtown, OH (US)

( * ) Notice: Subject to any disclaimer, the term of this patent is extended or adjusted under 35 U.S.C. 154(b) by 0 days.

(21) Appl. No.: 14/016,176

(22) Filed: Sep. 2, 2013

(51) Int. Cl.
*G09B 7/00* (2006.01)
*G09B 5/08* (2006.01)

(52) U.S. Cl.
CPC ..... *G09B 7/00* (2013.01); *G09B 5/08* (2013.01)

(58) Field of Classification Search
USPC .................................. 434/322, 323, 350, 365
See application file for complete search history.

(56) References Cited

U.S. PATENT DOCUMENTS

2006/0154227 A1* 7/2006 Rossi ................ G09B 5/14
434/350
2012/0308980 A1* 12/2012 Krauss ................ G09B 7/06
434/362

* cited by examiner

*Primary Examiner* — Kesha Frisby
(74) *Attorney, Agent, or Firm* — Ulmer & Berne, LLP; Vance V. Vandrake, III

(57) ABSTRACT

The present invention is a system, method, and teaching aid for continuously improving the system for educating students to a level of mastery and for systematically improving the mastery standard The invention includes a cost efficient system that enables multiple cycle of learning for each lesson, and the system is continuously reviewed and revised based on feedback showing the understanding and knowledge on the part of the students. Repetitive cycles of learning result in students with mastery level skill and confidence. The invention also includes a cost efficient method for creating the course and preparing instructors to teach the course.

29 Claims, 2 Drawing Sheets

SYSTEM, METHOD, AND TEACHING AID FOR ENABLING ALL STUDENTS WHO ARE WILLING TO BE ABLE TO ACHIEVE MASTERY OF LEARNING CONTENT AND A SYSTEM FOR EFFICIENTLY SYSTEMATICALLY INCREASING THE LEVEL THAT DEFINES MASTERY

CROSS-REFERENCE TO RELATED APPLICATION

Not applicable.

STATEMENT REGARDING FEDERALLY SPONSORED RESEARCH

Not applicable.

NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND ON THE INVENTION

1. Field of the Invention

The present invention relates generally to education, and more particularly, to a system, method, and teaching aid to drive never ending improvements in the effectiveness of how we educate and how students learn.

2. Description of the Related Art

Typical classroom teaching involves providing information to students through a combination of in class lectures and homework assignments for the students to complete outside of the classroom. The students' learning of the information is based on evaluation of homework assignments and subsequent tests.

Classroom lectures followed by exams is an efficient method for identifying those students with the greatest skill. However, even if a student gets 90% of the content correct on exams, it still means that 10% of the content has not been learned, and thus missed. This missing content can have multiplicative impact as learning content builds upon itself. For example, in the case of a student for Veterinarian medicine these "gaps," i.e., missed content, can create significant negative consequences when working with animals. In addition, the classic classroom teaching method does not provide an efficient and effective method for never ending increases in the level that is defined as mastery.

There have been attempts to change the traditional educational method set forth above with what is known as "flip teaching" or "flipped classroom." Flipped Classroom is a form of blended learning in which students learn new content by watching online video lectures outside of the traditional classroom setting. During scheduled classroom hours, what was assigned as homework in the traditional teaching method is now completed in the classroom with the assistance of the teacher.

Although an improvement in some aspects of learning, Flipped Classroom fails to provide a mechanism for enabling all willing students to achieve mastery and does not provide an efficient and effective method for never ending increases in the level that is defined as mastery.

Furthermore, where both the traditional and the flip teaching methods truly fail is the inability to provide real time assistance to the instructor prior to each class session They also fail in that the method of education and the method of evaluation of learning mastery are not linked. In fact, there are some indications that in order to increase the level of achievement some states have opted to reduce evaluation standards so to improve perceptions of learning. This "grade inflation" is a contributor to the decreases in achievement recorded among American students.

Benjamin Bloom developed a method for teaching called "Learning for Mastery" or "Mastery Learning." It is a method of one-on-one teacher interaction and feedback that has been shown to lead to higher achievement in all students. Although Mastery Learning is very effective, it is not feasible for practical implementation. It requires a level of teacher training, time for student interaction, and student management that is not cost effective in today's world of limited budgets and impatience for results. Further, the method of creating a Mastery Learning class is currently more of a "random art" then a "reliable system." By way of example, the current "best practice" for creating a teacher whose students demonstrate above average performance on Advanced Placement Exams in high school is 20 years of experience teaching.

In theory, it would be possible to execute Bloom's Mastery Learning using a complex computer program that enables each student to follow their own "learning adventure;" however this too would require a very time consuming and expensive investment. In practice this approach is more of a theory then a reality. A review of all students who are taking Advanced Placement courses both at their high school and from hundreds of on-line providers found that their achievement in the online courses versus the in-class courses was a full one point lower on the standardized five point scale.

The focus of education reform has been oriented towards testing of students, funding levels, teacher performance, on-line education and allocation of time in the classroom. These reforms have varied in scope and depth between countries due to differences in government structure, societal norms, technology access and others. There has been relatively little attention paid to the actual "system of teaching." For example, most on-line courses are simply digital translations of the classic teaching model. The context of the education reform discussion has been one that addresses the tactics of teaching rather then the system of teaching In countries such as the United States, the discussion around improving schools has focused on how to get better teachers, by nature of their personality, experience and passion, into the classroom. Dr. W. Edwards Deming found that "94% of quality problems are due to the system, 6% are due to the worker." By focusing on fixing the system of teaching instead of "beating the workers/teachers" sustained, systemic improvement can be achieved.

SUMMARY

Various exemplary embodiments of the present invention include a system that enables all willing students to achieve mastery of subject content and a systematic method for increasing the level that defines mastery. Most importantly, the system can be developed and implemented on a cost efficient basis. The system is comprised of at least two cycles of learning wherein each cycle has four stages defined as plan, do, study, and act that are repeated until the student achieves 100% correct. A first cycle of learning is where: PLAN: at least one student interacts with one or more digital lessons via an Internet-enabled device, DO: the student provides responses to one or more quiz questions posed based on content of the one or more digital lessons. STUDY: When a student gets an answer incorrect additional education is provided as feedback: ACT: the student is required to make another response. The cycle is repeated until the student achieves 100% mastery on the quiz.

A customized teaching aid is created based on the responses of the students of a particular class for the one or more digital lessons. During the second cycle of learning the instructor uses the advice from the guide to improve student learning in a classroom setting. Then another set of plan, do, study, act stages are executed. PLAN: one or more hands-on assignments are provided the students with direction guided based on the teaching aid. DO: The students complete and submit their assignments. STUDY: The instructor provides real time feedback relative to predetermined mastery standards. If student's work is not at mastery level they are provided additional educational feedback. ACT: The student reworks the assignment and the cycle continues until the student achieves 100% mastery.

As students complete assignments the percent correct during the first attempt at the first cycle quizzes and second cycle assignments are evaluated using a standard control chart. Specifically—when students are regularly achieving above the upper control limit; the education content, quiz and or assignments are increased in difficulty increasing the level defined as mastery. When students across class sections regularly achieve below the lower control limit; the learning content of the digital class or the assignments are improved to make them more effective at teaching the content. In a preferred embodiment, when students in a particular class (and not the sum of all class sections for a specific course) achieve below the lower control limit, then a check is made for special cause errors as defined by the control chart. Specifically, there is a check to determine whether there was there an error in delivery of the instructor aid or a non-compliance with the recommended teaching system.

Various exemplary embodiments of the present invention include a teaching aid comprised of a substrate; a plurality of visual components configured to selectively represent a graphical or illustrative depiction of the responses to the one or more questions for a particular lesson by students, suggested educational tactics to address those areas where students go the greatest percent wrong on first attempt. The teaching aid is developed and used in an improved educational system having at least two cycles of learning wherein each cycle has four stages defined as plan, do, study, and act. At least two cycles of learning include a first cycle of learning wherein at least one student interacts with one or more digital lessons via an Internet-enabled device, and the student provides responses to one or more questions posed based on content of the one or more digital lessons and from which a teaching aid is created based on the responses of each students of a particular class for the one or more digital lessons. A second cycle of learning is where an instructor guides students in a classroom setting in one or more hands-on assignments designed to provide additional levels of repetition and learning. The content of the one or more digital lessons and assignments are redeveloped to a new mastery standard based on control charts associated with the percentage of correct responses to the one or more questions on a first attempt by the students during each of the cycles.

The process for creating a class includes the following steps: 1 DEFINE: A Course Author divides the content into skills and sub skills sequenced in what they believe is the most effective learning order, 2) DISCOVER: A quick prototype is developed of the learning content, quizzes, assignments, teaching aid tactics and calibration standards for what is a mastery level response to quizzes and assignments. The content is implemented in a course with measurement of % correct on first attempt. 3) DEVELOP: A control chart is developed for the class. It is used to guide never ending improvement starting with the courses that fall below the lower control limit on the control chart. The education instruction content such as digital classes and teacher aid tactics are improved when courses fall below the control limit. This process continues until all classes are within the minimum control chart ranges. DELIVER: Teachers efficiently learn the process by participating in the class as a student. With this system experience indicates that a college course can be learned in about a day and a half. As the course is expanded with more instructors, the Course Author uses the data feed on Percent Correct on First Attempt to make never ending improvements in the course and the level that is defined as mastery.

To maximize cost efficiency and effectiveness of implementation a set of web enabled tools can be utilized. These include:

A) Quick Feedback: A web interface that allows teachers to quickly give feedback on a real time basis in class. They can type responses, give verbal recordings or give verbal feedback touching a button that indicates that "feedback given in class."

B) Group to Individual System: An Internet interface that enables students to quickly form a group to complete an assignment. If the assignment is incorrect, the system transfers it to an individual assignment so that all students gain the feedback and learning from correcting the assignment.

C) Transparent Grading: Students start the course with a grade point of zero. As they master skills they gain points. With a classic college semester, this breaks down to 4 points for the first week "start up" class plus 8 points for each of 12 weeks or 12 skills (8 times 12=96) for a total of 100 points.

D) An Internet interface that does not allow students access to the second cycle assignments unless they have successfully completed the first cycle. This makes sure that all students are prepared for the assignments.

E) Assignments in the second cycle of learning and beyond are often built to be in sequences of group followed by individual assignments that match. This builds repetitions, confidence and mastery.

BRIEF DESCRIPTION OF THE DRAWINGS

The various exemplary embodiments of the present invention, which will become more apparent as the description proceeds, are described in the following detailed description in conjunction with the accompanying drawings, in which.

DETAILED DESCRIPTION

The presently claimed invention includes a system and method for enabling all students who are willing to be able to achieve mastery of learning content and systematically increasing the level that defines mastery. Mastery is mathematically defined as a student's proven knowledge, comprehension, and control of a particular lesson by providing full correct responses to each quiz and activity. Mastery is defined in real world application as having the skills and confidence to effortless apply the course content in personal and work situations. While most styles and forms of education focus on abilities and knowledge of instructors, the presently claimed invention focuses on a means of improving educational effectiveness by using a cycles of learning approach with dynamic control charts where student's objective responses to one or more questions or assignments on a percent correct on first attempt. Students are provided educational feedback until they achieve the level of performance defined as mastery.

In typical college course, there are very few times for educational feedback loops to allow students to know where they are with learning and mastering a particular course or lesson. For example, in a typical college course there may be a homework assignment each week over a 12 week period, a midterm exam, and a final exam. This roughly means there are approximately 14 occasions for the student to get feedback on their understanding and mastery of a topic. Plus, this is assuming that the instructor is quickly grading and returning the homework and midterm exam for the student to learn.

As will be illustrated and explained below, the presently claimed invention allows for upwards of 100 or more educational feedback loops for each student in a single semester of education. This is assuming that each student who achieves mastery will complete approximately 12 quizzes and over 88 hands-on activities, for a total of about 100. It has been shown that on average about 50% of the quizzes or activities have to resubmit because students did not give fully correct responses. This means that there is an average of about 150 opportunities for each student to have an educational feedback loop in reaching mastery in a particular course. This means that a student learning through the presently claimed invention has an average of 10 times the number of educational feedback loops than a student in a traditional classroom setting gets.

Figure 1:
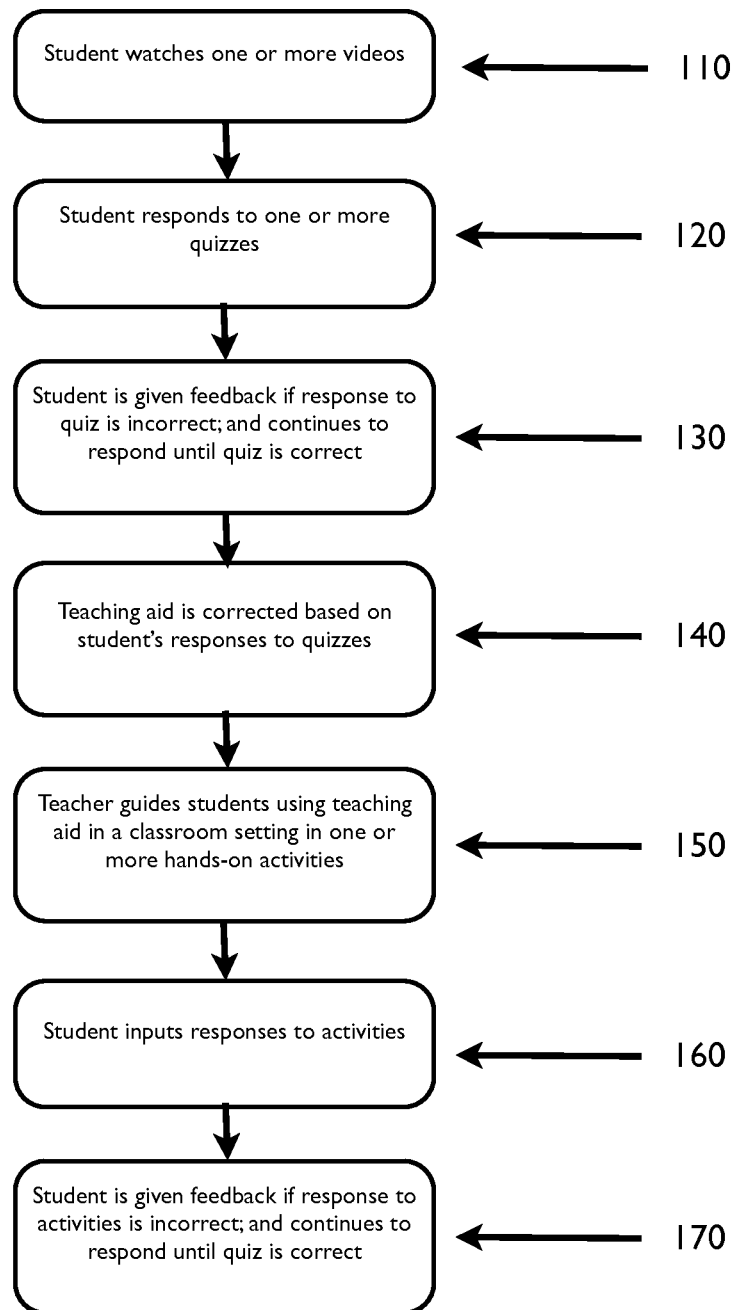
FIG. 1 is an illustration of a system according to the present invention having two cycles of learning.

Various exemplary embodiments of the present invention include a system for improving education of students. The system is comprised of at least two cycles of learning for each particular lesson; an exemplary embodiment of which is illustrated in FIG. 1. Each lesson is preferably focused on one or more critical skills with corresponding subskills. Each cycle of learning has four stages; the four stages being defined as plan, do, study, and act. The stages are repeated until the student achieves mastery of each quiz, assignment or task relative to the mastery standards.

It should be understood that this system can be used with students no matter the subject matter, content, or field of study. The system has been successfully piloted in courses with a focus on creativity, writing, mathematics and science.

The first cycle of learning on one or more skills includes a student interacting with one or more digital or live lessons via an Internet-enabled device such as, for example, a personal computer, a smartphone, an electronic tablet, or the like. Preferably, the first cycle learning is in the form of a digital lesson. See step 110 of FIG. 1

The one or more digital lessons may be in the form of text, video, audio, or a combination thereof. Preferable, the one or more digital lessons will be a combination of video, audio, and text in segmented lessons of less than thirty minutes each. More preferably, each digital lesson is approximately 5-8 minutes each.

Although the digital lessons are preferably provided via the Internet on an Internet-enabled device, the Internet-enabled device need not be connected to the Internet at the time the one or more digital lessons are interacted with by a student. The one or more digital lessons may be downloadable for viewing by a student at the student's convenience, but preferably, the digital lessons are viewable only through a connection to a particular website via the Internet.

Upon interacting with each digital lesson, each student provides responses to one or more questions. See step 120 of FIG. 1. The one or more questions relate to the content provided in the digital lesson. The one or more questions may be posed during the digital lesson, at the end each lesson, and a combination thereof.

The one or more questions may be in the form of multiple choice, fill-in-the-blank, true/false, matching, short answer, and a combination thereof. If a student gets an answer incorrect, the same student is provided with educational feedback to teach them why the answer they selected was incorrect. See step 130 of FIG. 1. Preferably the feedback does not tell the student the correct answer, except in the case of true/false questions.

After a set period of time for the students to complete the first cycle of learning, a teaching aid is created based on the percent correct on first attempt of all the students for each digital lesson available. See step 140 of FIG. 1.

The teaching aid includes a substrate; a plurality of visual components configured to selectively represent a graphical or illustrative depiction of the responses to the one or more questions for a particular lesson by students, suggested classroom tactics to help the students achieve mastery This teaching aid will provide guidance and coaching that the students will need in the classroom setting. It is the guide that allows the instructor to have a better grasp of what the students did and did not learn, as well as advice and tactics for helping the students achieve mastery of critical skills and sub-skills.

In a second cycle of learning, the students for a particular class meet during a preferably regularly-scheduled time period in a classroom setting. The in-class setting is preferred as it allows for students to easily do assignments in a group enabling peer to peer teaching and learning. Note, the peer support can also be provided in an online class format. During the second cycle of learning, one or more hands-on activities associated with the digital lessons of the first cycle of learning are presented and guided through by the instructor. See step 150 of FIG. 1. Student assignments are a combination of group and individual assignments. Preferably they are submitted via an Internet connected device so to make it efficient for the instructor to compare the student responses versus predetermined mastery standards. See step 160 of FIG. 1. Students are graded on a pass/fail basis relative to the mastery standard. Importantly, students are provided educational feedback when they don't meet the mastery standard. See step 170 of FIG. 1. Students repeat the cycle until they achieve mastery.

The net effect of using the cycles and repetition until 100% is that students achieve a true level of mastery of all content. It is common that a student in the top 20% of a class might do an average of 1.5 attempts at the first cycle per quiz and 1.9 responses to each of the second cycle assignments. Together this means 3.4 cycles of learning occur for just the one quiz question and assignment A student in the bottom 50% of a class might do 2.2 attempts at a quiz question during the first cycle and 3.5 responses to an assignment in the second cycle. Together this means 5.7 cycles for just the one quiz question and assignment. Importantly—every student who is willing to continue to make attempts—is given new education feedback—either verbally or in writing to each attempt, to help them achieve mastery A field experiment of an early version of the system using matched classes (Proposed method versus Classic Classroom) at the University of Maine in the field of Innovation Engineering® found a 200 to 400% improvement in the percentage of students achieving mastery of content depending on the measure. The learning from the test classes was then used to drive systematic improvement in the effectiveness of the course the next time it's taught College students who participated in experimental sections utilizing the invention had the following to say about the effectiveness of the new system of teaching.

How is this better? Less stress, don't really learn anything in other classrooms, whereas this allows the information to stick in your head so you don't forget it.

Failing isn't a bad thing here. You lose your fear of failing here, because it's okay. Because you are doing live grading, it's like you (the instructors) are working with us, not against us.

This class is more about learning. You're focusing more on the content. With less stress, you have more fun so you're learning more.

I've always struggled with regular lectures and I am always wondering if I'm really learning, but with this I feel like I am actually learning and actually building skills.

Compared to old classes, here you are learning a new way to think, not just the content. Working on changing the mind instead of cramming it with information.

You know what you have to do . . . . The old system is broken and shitty. In this class I feel like you are here to help me learn. When I go to other classes after this one—I feel like yelling—you're here to just show off how smart you are—you're not here to help me learn.

This is the best thing that ever happened to any college.

In another set of experiments—corporate executives attended a five day Innovation College, also in the field of Innovation Engineering, using the presently claimed system. By tracking student responses, the instructors were able to efficiently increase learning effectiveness and the standard defined as mastery on a monthly basis. In a classic teaching method or even a flipped classroom there would be no mechanism for driving this improvement.

Preferably, students who have not completed the first cycle of learning cannot start, and thus take part in, the second cycle of learning until the first cycle of learning is completed. The instructor will have access to a database providing the status of each student's completion of the first cycle of learning.

During the second cycle of learning, and with the use of the teaching aid, the instructor may implement teaching tactics such as provide an overview on content that students did not appear to learn based on the percentage of incorrect responses to the one or more questions of the first cycle of learning. In addition, if the percentage of correct responses to the one or more questions of the first cycle of learning is significantly high (for example, greater than 95%), the instructor may use some time at the start of the second cycle of learning to provide greater detail, depth, or overall content in topic in order to challenge the students to increase their knowledge and mastery.

During the second cycle of learning, students will have hands-on activities to put to practical use the skills, tools, and knowledge acquired from the first cycle of learning. The idea is that rather than just reciting facts or theories back to a teacher, the students have to put the skills, tools, and knowledge to use and extrapolate them into posed problems, opportunities, and exercises provided in the second cycle of learning.

For example, if a student learns about searching for patents in the first cycle of learning, in the second cycle of learning, the students may be instructed to find particular types of patents, particular patents for a technology, patents for a particular company, etc.

Like the first cycle of learning, the second cycle of learning has a feedback loop that evaluates the percentage of students getting the correct responses on a first attempt, and providing advice for improving responses when the student's submitted response is not correct or at the mastery level. Like the first cycle, the students are challenged to continue to rework the assignments based on the education feedback till they achieve mastery. The system success of the second cycle of learning is continuously evaluated and improved based on control charts similar to that explained in the first cycle of learning.

Preferably, in the second cycle of learning, the students do a first hands-on activity as a group of two or more students. This is then followed by subsequent hands-on activities that may also be group work, but also may be activities to be completed as submitted by each student individually. This allows the students to learn from one another, decrease fear by learning from one another, and increase the speed of learning. By the time the student submits an individual hands-on activity in the second cycle, the student should have greater confidence in the subject matter.

There may also be a third cycle of learning wherein the one or more students apply knowledge and understanding of the content of the digital lessons on a broader basis—connecting that week's learning with prior class learning. These "application" assignments or classes help the students integrate the learning on a broader basis As an example of an application class, using the above example for patent searching, students may need to find all the patents associated with a particular invention, and then suggest how to reinvent the particular invention to avoid the technology protected in the found patents. In this case, for example, the students would be using prior knowledge from classes on "Creating Innovations" and "Problem Solving," skills from the field Innovation Engineering study.

In an optional fourth cycle of learning, each of the one or more students could be directed to prepare a reflection to personally explore that which the student learned from the previous cycles of learning for a particular lesson or group of lessons. FIG. 1 illustrates a system having four cycles.

The fourth cycle of learning wherein a reflection is prepared by each student reinforces the learning by having each student consider and express what was learned or experienced such that the student recognizes how knowledge was gained and put to a practical problem in class.

In another optional cycle, a fifth cycle of learning, the one or more students apply skills and sub-skills from various different lessons to address real-world issues and challenges. Such real-world issues may be problems or opportunities provided by companies seeking outside help or suggestions from the students applying their knowledge in the particular skill/lesson.

The system set forth above preferably uses an Internet-based device for delivery of digital classes, class assignments, and feedback.

The present invention further includes a method for a never-ending increase in the mastery standard, the method being comprised of: conducting a first cycle of learning wherein at least one student interacts with one or more digital lessons via an Internet-enabled device, and the student provides responses to one or more questions posed based on content of the one or more digital lessons and from which a teaching aid is created based on the responses of each students of a particular class for the one or more digital lessons; and conducting a second cycle of learning wherein an instructor guides students in a classroom setting in one or more hands-on activities based on the teaching aid. Like the above system, each cycle has four stages defined as plan, do, study, and act. The content of the one or more digital lessons is redeveloped to a new mastery standard based on control charts associated with the percentage of correct responses to the one or more questions on a first attempt by the students.

Figure 2:
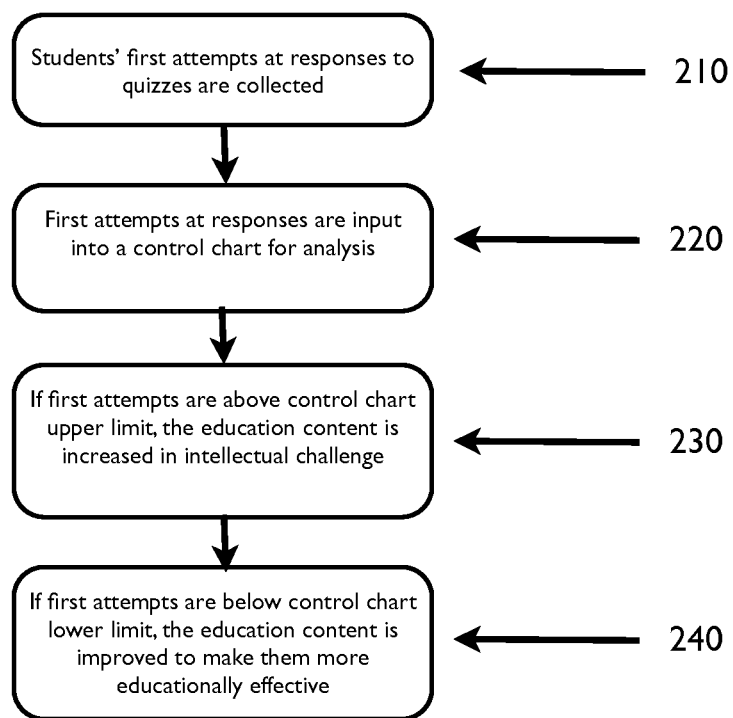
FIG. 2 is an illustration of how the first cycle of learning is analyzed and readjusted based on students' responses.

The content of the one or more digital lessons is redeveloped to a new mastery standard based on control charts associated with the percentage of correct responses to the one or more questions on a first attempt by the students. See step 210 of FIG. 2.

As students complete assignments the percent correct during the first try of the first cycle quizzes and second cycle assignments are evaluated using a standard Deming control chart. See step 220 of FIG. 2. Specifically, when students are regularly achieving above an upper control limit, the education content, quiz and or assignments are increased in difficulty increasing the level defined as mastery. See step 230 of FIG. 2. When students across class sections regularly achieve below the lower control limit, the learning content of the digital class or the assignments are improved to make them more effective at teaching the content. See step 240 of FIG. 2. Note, when students in one particular class, and not all the classes in the same course, achieve below the lower control limit then a check is made for special cause errors as defined by the Deming control chart. Specifically, was there an error in delivery of the instructor aid or a non-compliance with the recommended teaching system.

Regularly exceeding an upper control limit on the control chart for a particular lesson drives increases in the level defined as mastery for that lesson. When digital classes are first set, an upper control limit of 50 to 90% correct on first try by the students is utilized depending on the confidence the Course Author has in the class design. A level of 80% has been found to provide a balance of effectiveness versus production efficiency. As the system becomes "smarter" through repetitions, the goal is to increase students average success rate and to reduce variation in the process. A 90% correct by the students on a first attempt is the goal. The 90% level upper control limit provides motivation and ensures that changes are meaningful and not "fiddling" as Dr. Deming articulated in what is commonly known as Deming's Red Bead experiment.

Thus, in time, should 94% of the students across classes on a regular basis as defined in control charting provide the correct response(s) to the questions posed in the first cycle of learning, the actual digital lesson and quizzes associated with that particular skill/lesson are redesigned in order to have a greater intellectual challenge to students the next time the skill/lesson is taught. Having a greater intellectual challenge may include adding more content, having content of greater intellectual depth, providing more examples or extrapolations of the skill/lesson, etc.

Falling below a lower control limit of the control chart for a particular lesson drives improvement in the learning. When classes are first started, a lower control limit of 25 to 75% is used depending on the course author's confidence in the content. Experience indicates that a 50% level is a good balance of productivity versus over correction.

Thus—for the first cycle experience indicates that a good balance of productivity versus productivity is to set control chart limits of 80% and 50% for upper and lower control limits, respectively at the start. As the teaching system improves, the limits should statistically rise till a level of 90% and 75% for upper and lower control limits is achieved.

The mastery standard for the second and any subsequent cycles is different than the first cycle as the task is more "hands on" and by design, more challenging. At the start, as classes begin, the improvement process a lower control limit of 20 to 65% correct on first attempt with an upper level of 50 to 90% depending on the course author's confidence in the educational content.

Practical experience recommends starting points of a lower control limit of 40% correct on first attempt and an upper control limit of 70%. As the teaching system improves, the limits should statistically rise till a level of 65% and 80% for lower and upper control limits is achieved. It is important that enough stress is put on the students to challenge them through failure—but not so much that they are discouraged.

This continuous feedback loop puts the responsibility on the educational system for improvement in the student learning results and allows all willing students to gain knowledge and subsequent mastery of a skill/lesson. In practice, 200 to 400% increases in the percentage of students achieving mastery has been achieved. Thus, rather than segmenting students into sections based on their "intelligence" the invention enables all students who are willing to achieve mastery through implementation of cycles. The student who is less gifted initially may do more cycles to achieve mastery—however in the end they will reach the same level as the more initially gifted student.

Thus, rather than blaming the students for not learning what is being taught, the system of education is continuously improved through a systematic process that drives improvement of content, delivery, assignments and mastery standards. The result is the students learn more and the level defined as mastery continues to rise. In effect the invention creates "learning inflation" instead of "grade inflation."

The process for creating a class using the invention includes the following steps: 1) DEFINE: The Course Author divides the content into skills and sub skills sequenced in what they believe is the most effective education order, 2) DISCOVER: A quick prototype is developed of the learning content, quizzes, assignments, teacher aid tactics and calibration standards for what is a mastery level answer. The content is implemented in a course with measurement of percentage correct on first attempt. 3) DEVELOP: A control chart is developed for the class. It is used to guide never ending improvement starting with the courses that fall below the lower control limit on the control chart. The education instruction content such as digital classes and teacher aid tactics are improved when courses fall below the control limit. This process continues until all classes are within the minimum control chart ranges. DELIVER: Teachers efficiently learn the process by participating in the class as a student. With this system experience indicates that a college course can be learned in about a day and a half. As the course is expanded with more instructors the Course Author uses control charts on percentage correct on first attempt to make never ending improvements in the course and the level that is defined as mastery.

To maximize cost efficiency and effectiveness of implementation a set of web enabled tools can be utilized. These include:

A) Quick Feedback: An Internet interface that allows teachers to quickly give feedback on a real time basis in class. They can type responses, give verbal recordings or give verbal feedback touching a button that indicates that "feedback given in class."

B) Group to Individual System: An Internet interface that enables students to quickly form a group to complete an assignment. If the assignment is incorrect the system transfers it to an individual assignment so that all students gain the feedback and learning from correcting the assignment.

C) Transparent Grading: Students start the course with a grade point of zero. As they master skills they gain points. With a classic college semester this breaks down to 4 points for the first week "start up" class plus 8 points for each of 12 weeks or 12 skills (8 times 12=96) for a total of 100 points.

D) An Internet interface that does not allow students access to the second cycle assignments unless they have successfully completed the first cycle. This makes sure that all students are prepared for the assignments.

E) Assignments in the second cycle of learning and beyond are often built to be in sequences of group followed by individual assignments that match. This builds repetitions, confidence and mastery.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention.

What is claimed is:

1. A method for enabling all students who are willing to achieve mastery of learning content, the method being comprised of:

running a first cycle wherein at least one student interacts with one or more digital lessons via an Internet-enabled device, and the student provides responses to one or more questions posed based on content of the one or more digital lessons, and the student is provided education feedback when incorrect and is challenged to continue responding till a mastery level is achieved and from which a teaching aid is created based on the responses of each students of a particular class for the one or more digital lessons, and students who respond with the correct answer move on to a second cycle; and conducting the second cycle wherein an instructor guides students in a classroom setting in one or more hands-on activities guided by tactical advice provided by a teaching aid; students submit their responses to assignments and if incorrect versus a mastery standard the students get customized education feedback and are challenged to resubmit till a mastery level is achieved, wherein mastery is defined as a student's proven knowledge, comprehension, and control of a particular lesson by providing full correct responses to each quiz and activity, and at least two cycles of learning wherein each cycle has four stages defined as plan, do, study, and act, and wherein first cycle first responses and second cycle assignments first response correct levels by each student are evaluated using a standard control chart such that when students in a particular shared course regularly achieve above an upper control limit, education content, quiz, assignment, or a combination thereof are increased in difficulty raising intellectual challenge and the level defined as mastery; however, when students in the same shared course regularly achieve below a lower control limit, learning content of digital class or the assignments are improved to make them more effective at teaching the content, and when random classes, and not all classes for the shared course, achieve below the lower control limit then a check is made for special cause errors.

2. The method according to claim 1, wherein the upper control limit for the first cycle is initially set at 50 to 90% on one or more questions of a particular lesson being correct on a first attempt by each student as predetermined by a course author.

3. The method according to claim 1, wherein the upper control limit for the first cycle is initially set at 80% to one or more questions of a particular lesson being correct on a first attempt by each student.

4. The method according to claim 1, wherein the upper control limit is continually raised as the system becomes in greater control reaching a maximum level 90% to one or more questions of a particular lesson being correct on a first attempt by each student.

5. The method according to claim 1, wherein the lower control limit for the first cycle is initially set at 25 to 75% on one or more questions of a particular lesson being correct on a first attempt by each student as predetermined by a course author.

6. The method according to claim 1, wherein the lower control limit for the first cycle is initially set at 50% to one or more questions of a particular lesson being correct on a first attempt by each student.

7. The method according to claim 1, wherein the lower control limit is continually raised as the system becomes in greater control reaching a maximum level 75% to one or more questions of a particular lesson being correct on a first attempt by each student.

8. The method according to claim 1, wherein the upper control limit for the second or subsequent cycles is initially set at 50 to 90% on one or more assignments of a particular lesson being correct on a first attempt by each student as predetermined by a course author.

9. The method according to claim 1, wherein the upper control limit for the second or subsequent cycles is initially set at 70% to one or more questions of a particular lesson being correct on a first attempt by each student.

10. The method according to claim 1, wherein the upper control limit of the second or subsequent cycles is continually raised as the system becomes in greater control reaching a maximum level 80% to one or more assignments of a particular lesson being correct on a first attempt by each student.

11. The method according to claim 1, wherein the lower control limit for the second or subsequent cycles is initially set at 20 to 65% on one or more assignments of a particular lesson being correct on a first attempt by each student as predetermined by a course author.

12. The method according to claim 1, wherein the lower control limit for the second or more cycles is initially set at 40% to one or more assignments of a particular lesson being correct on a first attempt by each student.

13. The method according to claim 1, wherein the lower control limit for the second or more cycles is continually raised as the system becomes in greater control reaching a maximum level 65% to one or more assignments of a particular lesson being correct on a first attempt by each student.

14. The method according to claim 1, where the students one or more hands-on activities in the second cycle is graded and compared to predetermined criteria and for which the students receive real-time grading such that they can continue to submit and receive feedback until they get the one or more hands-on activities completely correct.

15. The method according to claim 1, wherein the students' input responses for the one or more activities into an Internet-connected device, and the real time grading is provided via the Internet by live graders.

16. The method according to claim 1, wherein each of the one or more students is not permitted nor able to proceed to the second cycle until the first cycle is completed by the same student.

17. The method according to claim 1, further comprising having a third cycle wherein the one or more students applies prior knowledge and understanding to an assignment.

18. The method according to claim 1, further comprising assigning a fourth cycle wherein each of the one or more students are directed to prepare a reflection to personally explore that which the student learned from the previous cycles of learning for a particular lesson or group of lessons.

19. The method according to claim 1, further comprising instructing a fifth cycle wherein the one or more students apply skills and sub-skills from various different lessons to address real-world issues and challenges.

20. The method according to claim 1, wherein the teaching aid is comprised of a substrate; a plurality of visual components configured to selectively represent a graphical or illustrative depiction of the responses to the one or more questions for a particular lesson by students, suggested classroom teaching tactics based on student responses, and identification of the particular lessons requiring additional direction from an instructor with the students.

21. The method according to claim 1, further comprising an Internet interface that enables students to quickly form a group to complete an assignment such that if the assignment responses input by the students in the group is incorrect, the system transforms the same assignment to an individual assignment for the students in the group inputting the incorrect responses so that all students individually gain the feedback and learning from correcting the assignment.

22. The method according to claim 1, further comprising an Internet interface that allows teachers to quickly give feedback on a real time basis in class where the teacher can type responses, give verbal recordings, or give verbal feedback and touching a button that indicates that feedback was given in class in order to record that such feedback was presented.

23. The method according to claim 1, wherein students start a course with a grade point of zero, gain points as each student masters skills such that all grades of a particular student in a course are viewed by the same student via an Internet connection, and in a classic college semester this breaks down to 4 points for the first week "start up" class plus 8 points for each of 12 weeks/skills.

24. The method according to claim 1, wherein assignments in the second cycle and any subsequent cycles are built to be in sequences of group assignments followed by related individual assignments to build repetitions, confidence, and mastery.

25. The method according to claim 1, wherein creation of a particular class includes the steps of:

a) DEFINE where a course author divides the content into skills and sub skills sequenced in what the course author believes is the most effective education order;

b) DISCOVER where a quick prototype is developed of the learning content, quizzes, assignments, teacher aid tactics, and calibration standards for what is a mastery level answer where the content is implemented in a course with measurement of % correct on first attempt;

3) DEVELOP where a control chart is developed for the class to guide never ending improvement starting with the courses that fall below the lower control limit on the control chart such that education instruction content such as digital classes and teacher aid tactics are improved when courses fall below the control limit, and such development continues until all classes are within the minimum control chart ranges; and 4) DELIVER where the class is expanded with more instructors and the course author uses a data feed on percent correct on a first attempt by the students to responses in the first cycle of learning to make never ending improvements in the class and the level that is defined as mastery.

26. The method according to claim 25, wherein teachers efficiently learn the process of teaching the class by watching the digital classes and participating in an at least one day program completing an assortment of assignments from the second or subsequent cycles and a review of the operational systems for grading and providing feedback.

27. The method according to claim 1, wherein each student who achieves mastery receives a minimum of 100 educational feedback loops through submission of responses to quizzes and hands-on activities in at least two cycles of learning.

28. The method according to claim 1, wherein the percent correct on first attempt of quizzes and assignments is used as the determining variable for education system assessment and improvement.

29. A teaching aid by use of an instructor for enabling all students who are willing to achieve mastery of learning content, wherein the teaching aid is comprised of a substrate with a plurality of visual components configured to selectively represent a graphical or illustrative depiction of the responses to the one or more questions for a particular lesson by students, suggested educational such that the teaching aid is created by having students experience a first cycle of learning wherein at least one student interacts with one or more digital lessons via an Internet-enabled device, and the student provides responses to one or more questions posed based on content of the one or more digital lessons, and the student is provided education feedback when incorrect and is challenged to continue responding till a mastery level is achieved and from which the teaching aid is created based on the responses of each students of a particular class for the one or more digital lessons, and wherein students who respond correctly move on to a second cycle; and then using the teaching aid in at least the second cycle of learning wherein an instructor guides students in a classroom setting in one or more hands-on activities guided by tactical advice provided by a teaching aid; students submit their responses to assignments and if incorrect versus a mastery standard the students get customized education feedback and are challenged to resubmit till a mastery level is achieved, and wherein mastery is defined as a student's proven knowledge, comprehension, and control of a particular lesson by providing full correct responses to each quiz and activity, and wherein each cycle has four stages defined as plan, do, study, and act.

* * * * *